US 9,710,199 B2

(12) United States Patent
Ioannou et al.

(10) Patent No.: US 9,710,199 B2
(45) Date of Patent: Jul. 18, 2017

(54) NON-VOLATILE MEMORY DATA STORAGE WITH LOW READ AMPLIFICATION

(71) Applicant: International Business Machines Corporation, Armonk, NY (US)

(72) Inventors: Nikolas Ioannou, Zurich (CH); Ioannis Koltsidas, Zurich (CH); Thomas Mittelholzer, Zurich (CH); Thomas Parnell, Zurich (CH); Roman Pletka, Uster (CH); Charalampos Pozidis, Thalwil (CH); Sasa Tomic, Kilchberg (CH)

(73) Assignee: International Business Machines Corporation, Armonk, NY (US)

( * ) Notice: Subject to any disclaimer, the term of this patent is extended or adjusted under 35 U.S.C. 154(b) by 163 days.

(21) Appl. No.: 14/536,550

(22) Filed: Nov. 7, 2014

(65) Prior Publication Data

US 2016/0132392 A1    May 12, 2016

(51) Int. Cl.
  G11C 29/00    (2006.01)
  G06F 3/06    (2006.01)
  G06F 11/10    (2006.01)

(52) U.S. Cl.
  CPC ............ G06F 3/0683 (2013.01); G06F 3/064 (2013.01); G06F 3/0619 (2013.01);
  (Continued)

(58) Field of Classification Search
  CPC ............ G06F 11/1076; G06F 11/1068; G06F 3/0683; G06F 3/064; G06F 3/0673; G06F 3/0619; G11C 29/52
  See application file for complete search history.

(56) References Cited

U.S. PATENT DOCUMENTS 5,386,531 A * 1/1995 Blaner ............... G06F 9/30043
                                                 711/201
6,105,109 A * 8/2000 Krumm ................ G06F 9/3802
                                                 711/122
(Continued)

FOREIGN PATENT DOCUMENTS

CN    101958720 B    3/2013
CN    103200467 A    7/2013
(Continued)

OTHER PUBLICATIONS

Camp et al., U.S. Appl. No. 14/581,954, filed Dec. 23, 2014.
(Continued)

*Primary Examiner* — Guy Lamarre
(74) *Attorney, Agent, or Firm* — Zilka-Kotab, P.C.

(57) ABSTRACT

In one embodiment, an apparatus includes one or more memory devices, each memory device having non-volatile memory configured to store data, and a memory controller connected to the one or more memory devices, the memory controller being configured to receive data to be stored to the one or more memory devices, store read-hot data within one error correction code (ECC) codeword as aligned data, and store read-cold data to straddle two or more ECC codewords as non-aligned data and/or dispersed data. According to another embodiment, a method for storing data to non-volatile memory includes receiving data to store to one or more memory devices, each memory device including non-volatile memory configured to store data, storing read-hot data within one ECC codeword as aligned data, and storing read-cold data to straddle two or more ECC codewords as non-aligned data and/or dispersed data.

20 Claims, 14 Drawing Sheets

(52) U.S. Cl.
CPC ........ *G06F 3/0673* (2013.01); *G06F 11/108* (2013.01); *G06F 2211/1059* (2013.01)

(56) References Cited

U.S. PATENT DOCUMENTS

| | | | |
|---|---|---|---|
| 6,128,623 | A | 10/2000 | Mattis et al. |
| 6,467,021 | B1 | 10/2002 | Sinclair |
| 6,857,087 | B2 | 2/2005 | Crozier et al. |
| 7,437,492 | B2 | 10/2008 | Stager et al. |
| 7,904,640 | B2 | 3/2011 | Yano et al. |
| 8,176,381 | B2 | 5/2012 | Djordjevic et al. |
| 8,533,550 | B2 | 9/2013 | Khan |
| 8,560,926 | B2 | 10/2013 | Yeh |
| 8,601,210 | B2 | 12/2013 | Jibbe et al. |
| 8,751,904 | B2 | 6/2014 | Wang et al. |
| 8,954,693 | B2 | 2/2015 | Seo et al. |
| 9,063,874 | B2 | 6/2015 | Zhong et al. |
| 2003/0071653 | A1 | 4/2003 | Carberry et al. |
| 2008/0059695 | A1* | 3/2008 | Tanaka ............... G06F 3/0613 711/103 |
| 2008/0126742 | A1* | 5/2008 | Shupak ............... G06F 21/52 711/217 |
| 2008/0137419 | A1* | 6/2008 | Cernea ............... G11C 29/846 365/185.09 |
| 2009/0216936 | A1* | 8/2009 | Chu .................... G06F 12/0246 711/103 |
| 2011/0154158 | A1 | 6/2011 | Yurzola et al. |
| 2012/0063533 | A1 | 3/2012 | Fonseka et al. |
| 2012/0072801 | A1* | 3/2012 | Takeuchi ............ G06F 1/3203 714/755 |
| 2012/0260150 | A1 | 10/2012 | Cideciyan et al. |
| 2013/0013974 | A1 | 1/2013 | Cideciyan et al. |
| 2013/0114339 | A1 | 5/2013 | Kawamura et al. |
| 2013/0132504 | A1 | 5/2013 | Kohli et al. |
| 2013/0151803 | A1 | 6/2013 | Tofano |
| 2013/0179752 | A1 | 7/2013 | Shim et al. |
| 2013/0246721 | A1 | 9/2013 | Fukutomi et al. |
| 2013/0318051 | A1 | 11/2013 | Kumar et al. |
| 2014/0026013 | A1 | 1/2014 | Koseki |
| 2014/0032861 | A1 | 1/2014 | Islam et al. |
| 2014/0258628 | A1 | 9/2014 | Shivashankaraiah et al. |
| 2015/0154118 | A1 | 6/2015 | Marcu et al. |
| 2015/0220277 | A1 | 8/2015 | Lee et al. |
| 2015/0227418 | A1* | 8/2015 | Cai .................... G06F 11/1048 714/768 |
| 2016/0048354 | A1 | 2/2016 | Walsh et al. |
| 2016/0077960 | A1 | 3/2016 | Hung et al. |
| 2016/0179614 | A1 | 6/2016 | Camp et al. |

FOREIGN PATENT DOCUMENTS

| | | |
|---|---|---|
| CN | 103941116 A | 7/2014 |
| CN | 104123238 A | 10/2014 |
| EP | 1632845 A2 | 3/2006 |
| EP | 2823401 A1 | 1/2015 |
| KR | 101379883 B1 | 4/2014 |
| WO | WO8909468 A1 | 10/1989 |
| WO | 2007084751 A2 | 7/2007 |
| WO | 2013147819 A1 | 10/2013 |

OTHER PUBLICATIONS

Redmill et al., "The EREC: An Error-Resilient Technique for Coding Variable-Length Blocks of Data," IEEE Transactions on Image Processing, vol. 5, No. 4, Apr. 1996, pp. 565-574.

Zuck, A. et. al., "Compression and SSD: Where and How?" INFLOW, Oct. 5, 2014, pp. 1-10.

Chen, X. et. al., "C-Pack: A High-Performance Microprocessor Cache Compression Algorithm," IEEE Transactions on Very Large Scale Integration (VLSI) Systems, vol. 18, No. 8, Aug. 2010, pp. 1196-1208.

Sadler, C. et. al., "Data Compression Algorithms for Energy-Constrained Devices in Delay Tolerant Networks," SenSys '06, Nov. 1-3, 2006, pp. 265-278.

Camp et al., U.S. Appl. No. 14/864,666, filed Sep. 24, 2015.

Gupta et al., "DFTL: A Flash Translation Layer Employing Demand-based Selective Caching of Page-level Address Mappings," ASPLOS '09, Mar. 7-11, 2009, pp. 1-12.

Ioannou et al., U.S. Appl. No. 14/945,228, filed Nov. 18, 2015.

Van, V. T. et al., "A Novel Error Correcting System Based on Product Codes for Future Magnetic Recording Channels," 2011, pp. 1-4.

Yang, C. et al., Product Code Schemes for Error Correction in MLC NAND Flash Memories, IEEE Transactions on Very Large Scale Integration (VLSI) Systems, 2011, pp. 1-13.

Wu, G. et al., "Reducing SSD Read Latency via NAND Flash Program and Erase Suspension," 2012, pp. 1-7.

Lim, H. et al., "SILT: A Memory-Efficient, High-Performance Key-Value Store," SOSP '11, Oct. 23-26, 2011, pp. 1-13.

Justesen, J., "Performance of Product Codes and Related Structures with Iterated Decoding," IEEE Transactions on Communications, vol. 59, No. 2, Feb. 2011, pp. 407-415.

Justesen, J., "Error Correcting Coding for OTN," IEEE Communications Magazine, ITU-T Optical Transport Network, Sep. 2010, pp. 70-75.

International Business Machines Corporation, UK Patent Application No. 1407279.7, filed Apr. 25, 2014.

Non-Final Office Action from U.S Appl. No. 14/581,954, dated Aug. 26, 2016.

Final Office Action from U.S. Appl. No. 14/581,954, dated Feb. 21, 2017.

* cited by examiner

| | | | | | | | | | |
|---|---|---|---|---|---|---|---|---|---|
| SSD 0 | S0-0 | | P0 | S1-0 | | P1 | S2-0 | | P2 |
| SSD 1 | S0-1 | - | P0 | S1-1 | - | P1 | S2-1 | - | P2 |
| SSD 2 | S0-2 | - | P0 | S1-2 | - (S0-PA) | P1 | S2-2 | S0-PB | P2 |
| SSD 3 | S0-3 | S0-PC | P0 | S1-3 | S0-PD | P1 | S2-3 | S0-PE | P2 |
| SSD 4 | S0-4 | S0-PF | P0 | S1-4 | S0-PG | P1 | S2-4 | S1-PA | P2 |
| SSD 5 | S0-5 | S1-PB | P0 | S1-5 | S1-PC | P1 | S2-5 | S1-PD | P2 |
| SSD 6 | S0-6 | S1-PE | P0 | S1-6 | S1-PF | P1 | S2-6 | (S1-PG, S2-PA) | P2 |
| SSD 7 | S0-7 | S2-PB | P0 | S1-7 | S2-PC | P1 | S2-7 | S2-PD | P2 |
| SSD 8 | S0-8 | S2-PE | P0 | S1-8 | S2-PF | P1 | S2-8 | S2-PG | P2 |
| SSD 7 | S0-9 | PP-A | P0 | S1-9 | PP-B | P1 | S2-9 | PP-C | P2 |
| | ... S0-P | | | ... S1-P | | | ... S2-P | | |

FIG. 10

NON-VOLATILE MEMORY DATA STORAGE WITH LOW READ AMPLIFICATION

BACKGROUND

The present invention relates to flash memory, and more particularly, this invention relates to optimized data packaging in flash memory.

Performance characteristics of NAND flash-based solid-state drives (SSDs) are fundamentally different traditional hard disk drives (HDDs). Data is organized in pages, each page typically being 4, 8, or 16 KB in size. Page read operations are typically one order of magnitude faster than write operations, and latency neither depends on the current nor the previous location of operations, unlike in HDDs. However, memory locations must be erased prior to writing to the same memory location. The size of an erase block unit is typically 256 pages, and the erase operation takes approximately one order of magnitude more time than a page program operation. Due to these properties of NAND flash memory, SSDs write data out-of-place, and maintain a mapping table that maps logical to physical addresses, called a logical-to-physical table (LPT).

Since flash chips/blocks/pages are capable of exposing errors or completely failing due to limited endurance or other reasons, additional redundancy has to be applied within flash pages, sing error correction code (ECC) such as Bose-Chaudhuri-Hoequenghen (BCH), as well as applying redundancy across flash chips, such as redundant array of independent disks or drives (RAID) configurations including RAID-5, RAID-6 and other similar schemes.

Garbage Collection (GC) in the context of flash SSD controllers refers to the process of identifying blocks of pages (or block-stripes depending on the specific controller and the respective GC unit of operation) to be reclaimed for future usage and relocating all still valid pages therein. A GC unit of operation is referred to herein as a Logical Erase Block (LEB). Note that a LEB may include any multiple of the physical flash blocks, which is the unit of physical erasure. For example, in a RAID scheme, multiple flash blocks from different lanes (i.e., channels) may be grouped together in a block stripe. Since the RAID parity is computed against the data in all the participating blocks, these blocks cannot be reclaimed individually. Rather, the full stripe has to be garbage-collected as a single unit. Garbage collecting a LEB requires relocation of any valid logical pages within a LEB to new physical pages to allow for erasing the entire LEB and subsequently making it (or the flash blocks it includes in case it was formed out of multiple flash blocks as a block-stripe) ready to be populated with new logical pages. The amount of data relocated due to GC relocation of valid pages constitutes garbage-collection induced write amplification, which is undesirable.

In addition, the "heat" of data refers to the rate (frequency) at which the data is read. "Hot" data tends to be read very frequently, whereas "cold" data is only rarely read. Tracking the heat of a logical page involves, for instance, allocating a certain number of bits in the LPT mapping entry for the page to keep track of how many read operations the page has seen in a certain time period or window.

SUMMARY

In one embodiment, an apparatus includes one or more memory devices, each memory device having non-volatile random access memory (NVRAM) configured to store data, and a memory controller connected to the one or more memory devices, the memory controller being configured to receive data to be stored to the one or more memory devices, store read-hot data within one error correction code (ECC) codeword as aligned data, and store read-cold data to straddle two or more ECC codewords as non-aligned data and/or dispersed data.

In another embodiment, a computer program product for storing data in non-volatile memory includes a computer readable storage medium having program instructions embodied therewith, the program instructions being readable and/or executable by a processor to cause the processor to: receive data, by the processor, to store to one or more memory devices, each memory device having non-volatile memory configured to store data, store, by the processor, read-hot data within one ECC codeword as aligned data, and store, by the processor, read-cold data to straddle two or more ECC codewords as non-aligned data and/or dispersed data.

According to another embodiment, method for storing data to non-volatile memory includes receiving data to store to one or more memory devices, each memory device including non-volatile memory configured to store data, storing read-hot data within one ECC codeword as aligned data, and storing read-cold data to straddle two or more ECC codewords as non-aligned data and/or dispersed data.

Other aspects and embodiments of the present invention will become apparent from the following detailed description, which, when taken in conjunction with the drawings, illustrate by way of example the principles of the invention.

BRIEF DESCRIPTION OF THE SEVERAL VIEWS OF THE DRAWINGS

FIG. 10 is a block diagram of a set of physical flash pages for use in a redundant array of independent disks or drives (RAID) arrangement, according to one embodiment.

DETAILED DESCRIPTION

Figure 1:
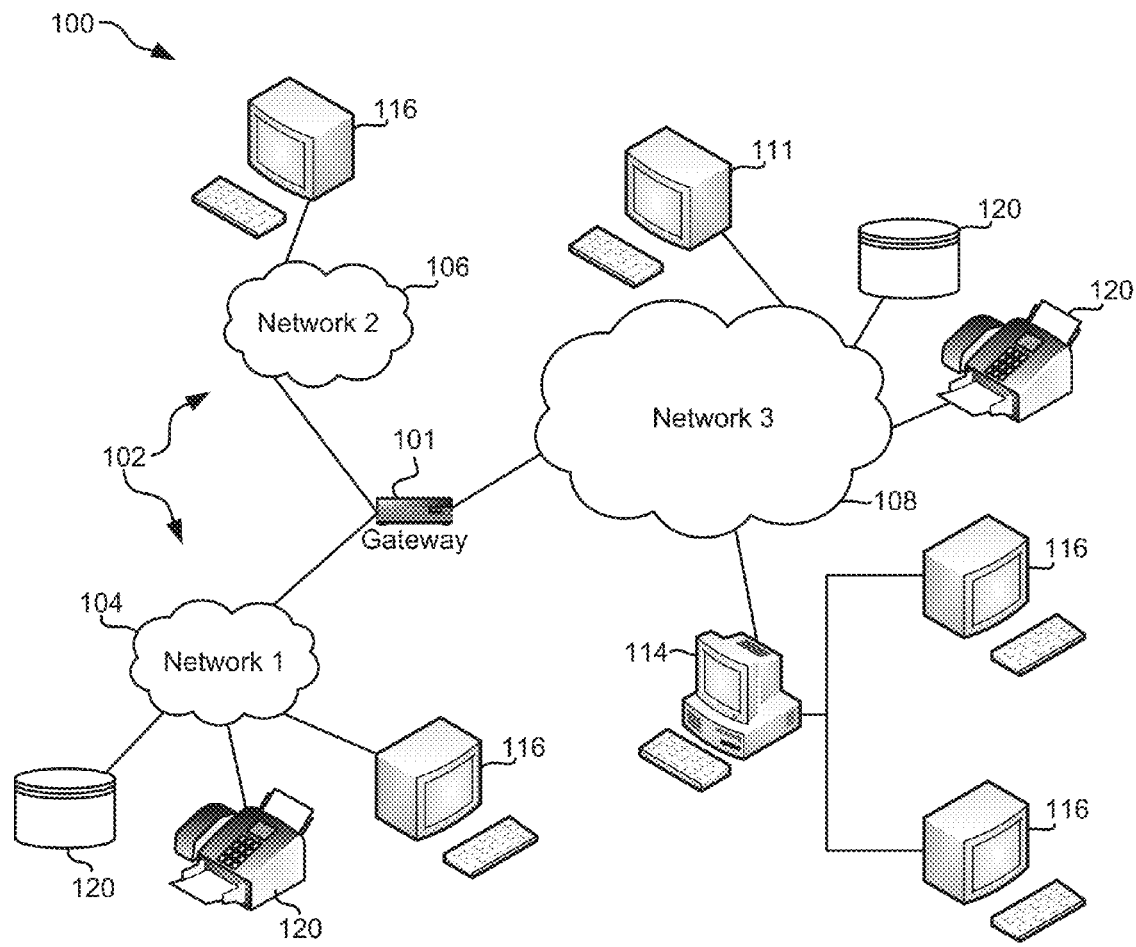
FIG. 1 illustrates a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an," and "the" include plural referents unless otherwise specified.

In NAND flash memory systems with error correction codes (ECC), where the ECC codeword has a payload of length N and the system accesses read and/or write data words of length K, where K is strictly less than N, if a data word straddles two (or more) ECC codewords, then upon reading two (or more) full ECC codewords, these two (or more) ECC codewords must be transferred to the controller to retrieve the error-free data word—thus reducing available bandwidth between the flash memory and the controller. This problem is referred to as "read amplification" (RA). This problem arises in storage systems based on non-volatile memory that employ ECC where the payload length is longer than the granularity of read/write access.

In order to improve read performance, in various embodiments described herein, space efficiency of the non-volatile memory, such as flash memory, may be sacrificed in order to reduce read amplification, as well as taking advantage of heat tracking of the data to improve the amount of space efficiency which is sacrificed for real-world workloads and applications.

In one embodiment, an apparatus includes one or more memory devices, each memory device having non-volatile memory configured to store data, and a memory controller connected to the one or more memory devices, the memory controller being configured to receive data to be stored to the one or more memory devices, store read-hot data within one ECC codeword as aligned data, and store read-cold data to straddle two or more ECC codewords non-aligned data and/or dispersed data.

In another embodiment, a computer program product for storing data in non-volatile memory includes a computer readable storage medium having program instructions embodied therewith, the program instructions being readable and/or executable by a processor to cause the processor to: receive data, by the processor, to store to one or more memory devices, each memory device having non-volatile memory configured to store data, store, by the processor, read-hot data within one ECC codeword as aligned data, and store, by the processor, read-cold data to straddle two or more ECC codewords as non-aligned data and/or dispersed data.

According to another embodiment, a method for storing data to non-volatile memory includes receiving data to store to one or more memory devices, each memory device including non-volatile memory configured to store data, storing read-hot data within one ECC codeword as aligned data, and storing read-cold data to straddle two or more ECC codewords as non-aligned data and/or dispersed data.

FIG. 1 illustrates a network architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives s at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks, in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which virtually hosts a MICROSOFT WINDOWS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 2:
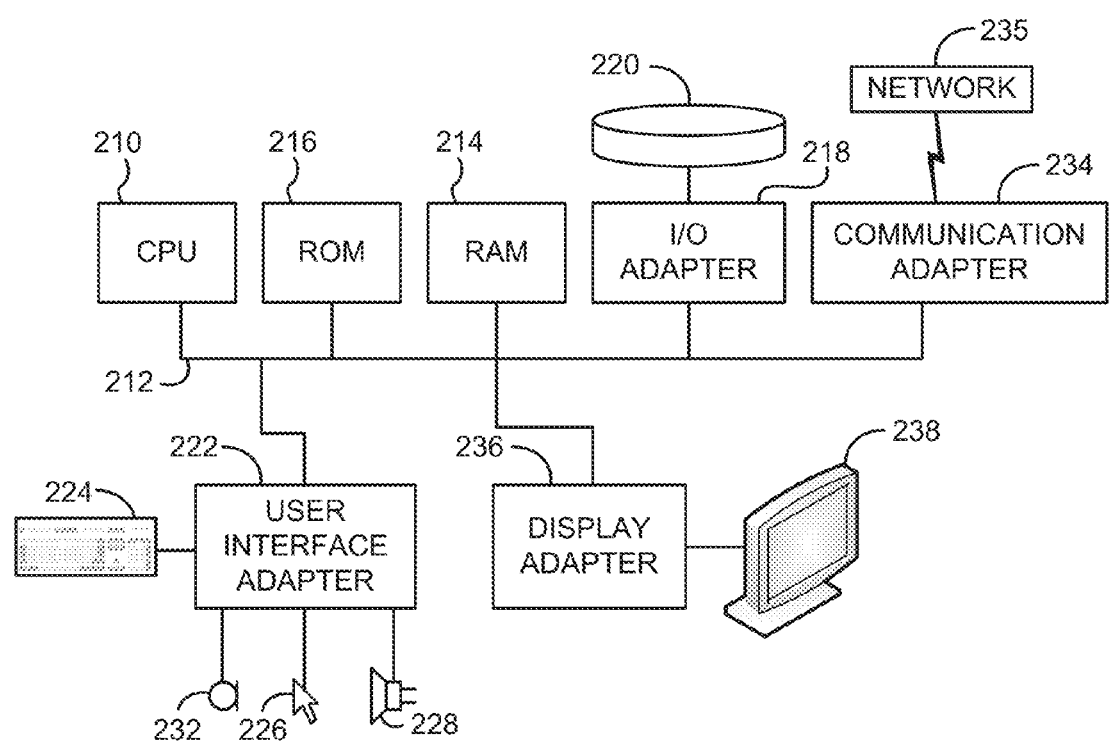
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. FIG. 2 illustrates a typical hardware configuration of a workstation having a central processing unit 210, such as a microprocessor, and a number of other units interconnected via a system bus 212, according to one embodiment.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen, a digital camera (not shown), etc., to the bus 212, communication adapter 234 for connecting the workstation to a communication network 235 (e.g., a data processing network) and a display adapter 236 for connecting the bus 212 to a display device 238.

The workstation may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

A metric of Read Amplification (RA) is relied upon in descriptions included herein which is defined as shown in Equation 1.

$$RA = \frac{\text{Data transferred from Flash}}{\text{Data returned to the user}} \quad \text{Equation 1}$$

in addition, a metric referred to as Space Efficiency (SE) is used in descriptions included herein and is defined to be equal to a portion of the memory space occupied by user data (as opposed to parity or other metadata stored to the physical flash pages), as shown in Equation 2.

$$SE = \frac{\text{Space occupied by user data}}{\text{Total memory space}} \quad \text{Equation 2}$$

In one embodiment, the RA may be reduced without relinquishing too much of the SE. As mentioned earlier, a physical flash page typically has a size on the order of 4 KB, 8 KB, 16 KB, etc. However, as host systems typically access data at a 4 KB-granularity, flash-based devices are typically optimized for 4 KB-page accesses. Therefore, multiple 4 KB logical pages (or sub-pages which are smaller than entire pages) are packed together in a physical flash page. Along with the logical page data, metadata is also stored, the metadata indicating some aspect or characteristic of the data being stored, such as name, size, ECC information (also referred to as parity or parity bits), information for reconstructing table structures after a sudden power loss, etc.

Although logical pages are described herein, there is no limit as to how the data is split up to be stored to non-volatile memory, and any size of data portions may be used for splitting up data to be stored to the non-volatile memory, including, but not limited to, 4 KB logical pages. Furthermore, the descriptions provided herein which reference logical pages are not limited to only being used on logical pages, and the descriptions are intended to encompass any size of data portion that may be stored to non-volatile memory.

Figure 3:
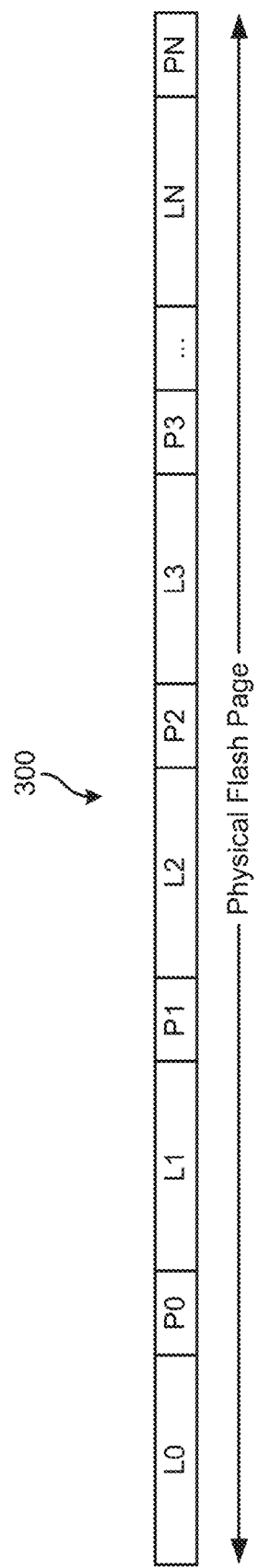
FIG. 3 is a block diagram of a physical flash page, according to one exemplary embodiment.

In an ideal case, the logical pages and the parity perfectly align with the size of a physical flash page 300, as shown in FIG. 3. In this exemplary physical flash page 300, each logical page (L0, L1, . . . , LN) is followed by corresponding parity (P0, P1, P2, etc.), and the physical flash page 300 contains all of the data for all logical pages and parity thereof with no overlap or underutilization (e.g., perfect alignment).

A codeword is the unit of ECC encoding and decoding, i.e., a set of bits that are encoded and decoded together to form data. In our example, a codeword includes the user bits (data) and the parity bits added by the specific ECC code that is being used for encoding the data. A codeword is stored on continuous space in a flash page. The actual size of a codeword, including the number of user bits and the number of parity bits is dictated by the ECC code in use. In what follows, it is assumed that a specific code has been pre-selected according to its particular error correction strength and requirements of the application (what the type of data being stored requires for correction capabilities).

Figure 4:
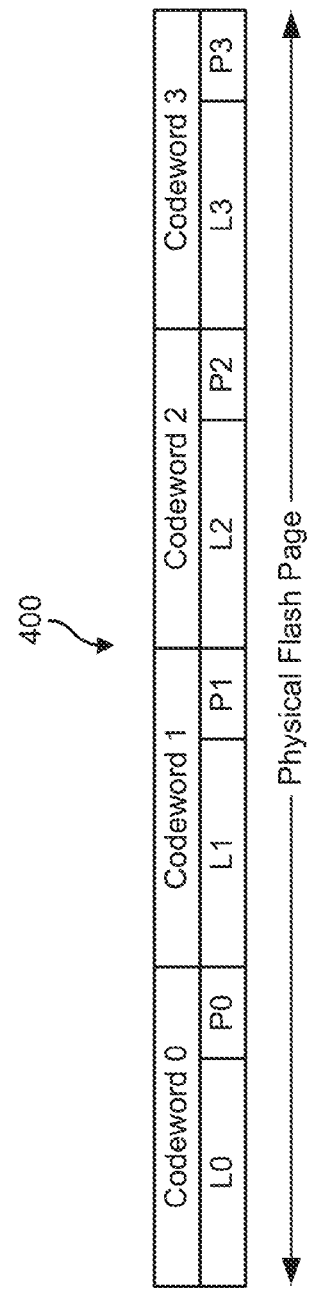
FIG. 4 is a block diagram of a physical flash page, according to one exemplary embodiment.
Figure 5:
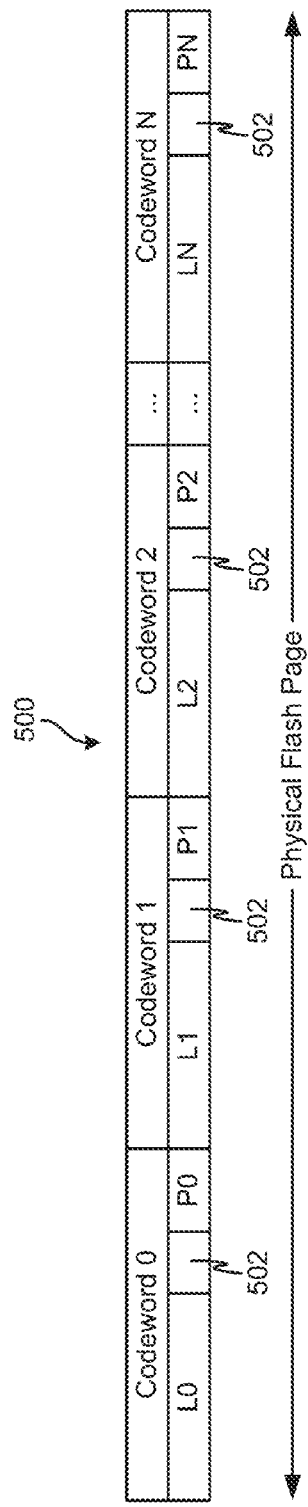
FIG. 5 is a block diagram of a physical flash page, according to one exemplary embodiment.

In the previous example, an ECC code may result in four aligned codewords in the flash page 400, as shown in FIG. 4 according to one exemplary embodiment. Unfortunately, this is not usually the case when dealing with real world applications. The geometry of the flash page 400 and usage of practical ECC codes result in codewords that are aligned to physical flash pages, but not to logical pages. In such a case, it may be decided to not immediately use some flash memory space 502 in order to achieve logical-page-to-codeword alignment, as shown by the physical flash page 500 in FIG. 5 according to one exemplary embodiment.

The data storage and flash page alignment exhibited by the flash page 500 is referred to as aligned packing. Clearly, this solution is not optimal as it effectively reduces the usable flash memory capacity in the device due to the unused space repeated for each codeword. One solution is to adopt a coding scheme that packs more user data and/or higher-level parity data in each codeword, effectively storing more than a logical page per codeword, thereby improving space optimization.

Figure 6:
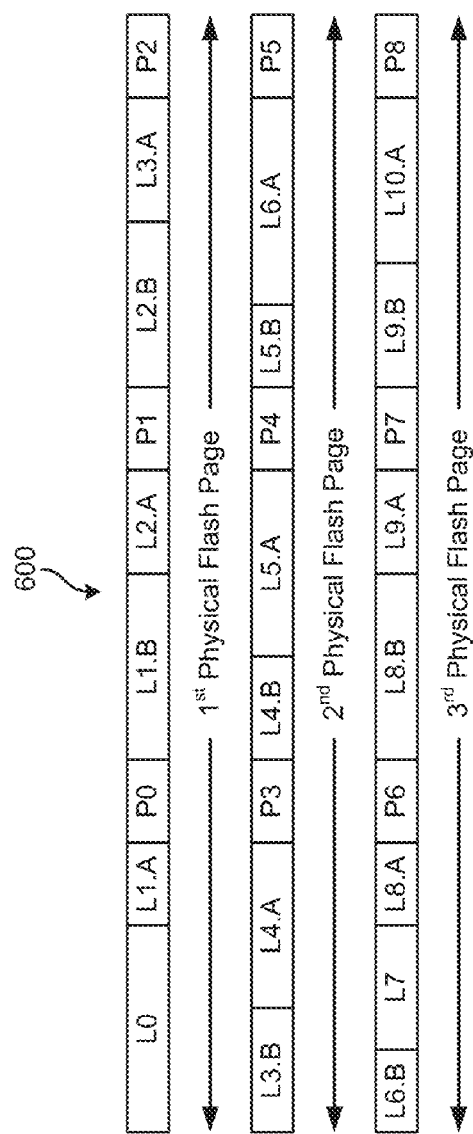
FIG. 6 is a block diagram of a set of physical flash pages using a tight packing scheme, according to one embodiment.

One such tight packing scheme is shown in FIG. 6 according to one embodiment, where the physical flash page 600 achieves optimal space utilization, but the tight packing scheme introduces some additional complexity and reduced read efficiency. The additional complexity is due to logical user pages overlapping or crossing over codeword boundaries (and as a result, boundaries of the physical flash page 600 in some cases). In particular, one effect of logical user pages straddling codeword boundaries is an increase in RA.

For instance, to read the logical page 6 (L6), the device reads the $2^{nd}$ physical flash page and transfers the data corresponding to the $3^{rd}$ codeword, decodes it, and extracts L6.A. Then, the device reads the $3^{rd}$ physical flash page and transfers the data corresponding to the $1^{st}$ codeword, decodes it, and extracts L6.B. Next, the two page fragments are combined for the logical page to be re-assembled. Given that all this logic is executed in hardware, this scheme imposes significant design overhead. Read latency is increased since it is necessary to read two physical pages, and decode two codewords, while RA is increased since it is necessary to transfer two entire codewords from the flash chip(s) to the controller.

In one example, when a user requests logical page 0 (L0), the device reads the $1^{st}$ physical page and transfers the data corresponding to the $1^{st}$ codeword, decodes the codeword, extracts the L0 data, and returns it to the user. Compared to the previous example, the read latency is much improved since it is only necessary to read one physical page, and decode one codeword. RA is also improved since it is only necessary to transfer data corresponding to a single codeword from the flash chips to the controller.

Figure 7:
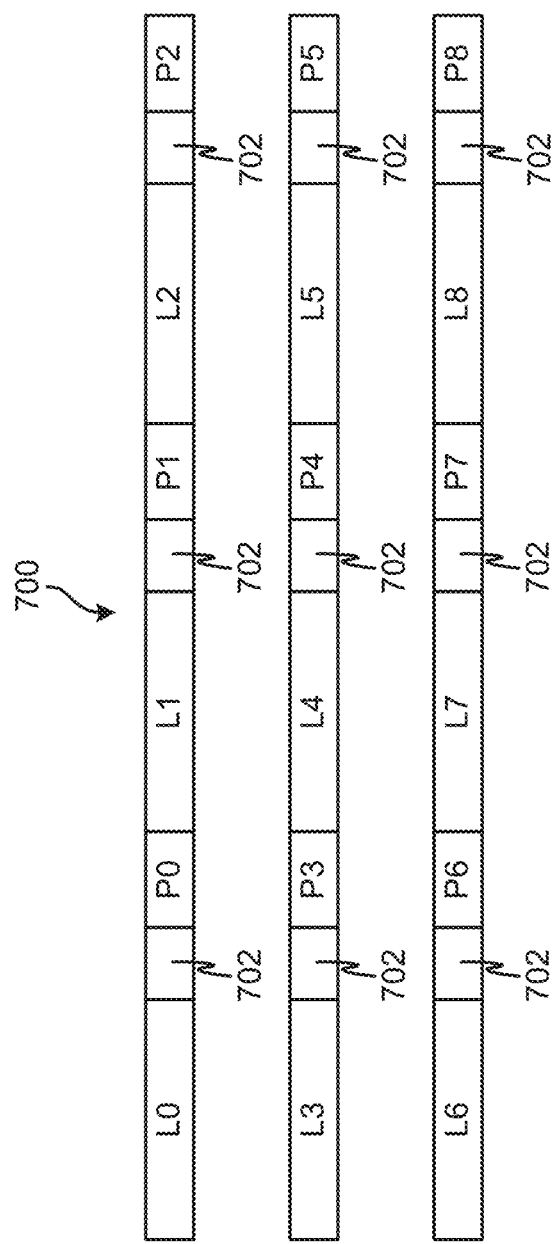
FIG. 7 is a block diagram of a set of physical flash pages using an aligned packing scheme, according to one embodiment.

For the aligned packing scheme, the layout of the physical flash pages 700 is shown in FIG. 7 according to one embodiment. As shown, logical pages (L0, L1, L2, etc.) are stored with blank space 702 and parity (P0, P1, P2, etc.) to ensure that one logical page is stored to each ECC codeword. The RA incurred by the aligned packing scheme is the lowest possible for the given flash geometry and ECC code. However due to the unused space that exists within the codewords, the SE for the aligned packing scheme can be sub-optimal.

In order to obtain a lower RA without sacrificing SE, skewed packing is introduced, according to one embodiment. Skewed packing is configured to store as many complete aligned pages as practical within a plurality of physical pages, and then storing dispersed pages in the space that remains.

Figure 8:
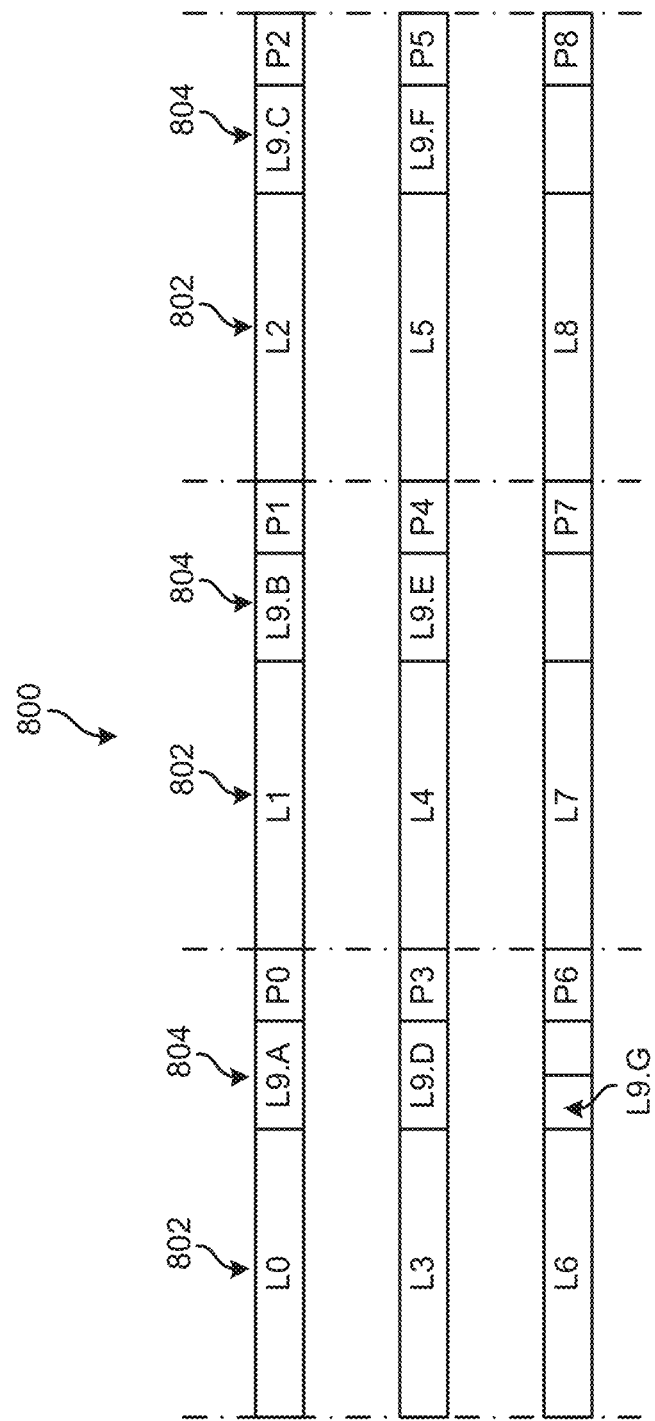
FIG. 8 is a block diagram of a set of physical flash pages using a skewed packing scheme, according to one embodiment.

For the skewed packing scheme, the layout of the physical flash pages 800 is shown in FIG. 8 according to one embodiment. According to this embodiment, groups of 3 physical pages store 8 logical pages. The first 7 logical pages are stored as aligned pages without crossing codeword boundaries, with the $8^{th}$ logical page being decomposed to 7 fragments and spread across 7 codewords.

When reading an aligned page 802, the read latency and RA may be minimized for the given flash chip and ECC scheme. Reading the dispersed page 804, comprises reading three physical pages, transfer the data corresponding to seven codewords, decode seven codewords, and then reconstruct the logical page to return to the user. Read latency is sub-optimal for these pages since it involves reading three physical pages and decoding seven codewords. RA is also poor since seven codewords are transferred from the NVRAM chips to the NVRAM controller.

While the worst-case RA and read latency are sub-optimal for the skewed packing scheme, since relatively few of the logical pages are stored as dispersed pages, the average performance may be acceptable. Furthermore, since the unused space within the codewords is filled with dispersed pages, SE is very high. However, for some applications the worst-case read latency may be critical and thus in order to alleviate these issues in the usage of the skewed packing scheme 800, some techniques are presented in various embodiments.

Figure 9:
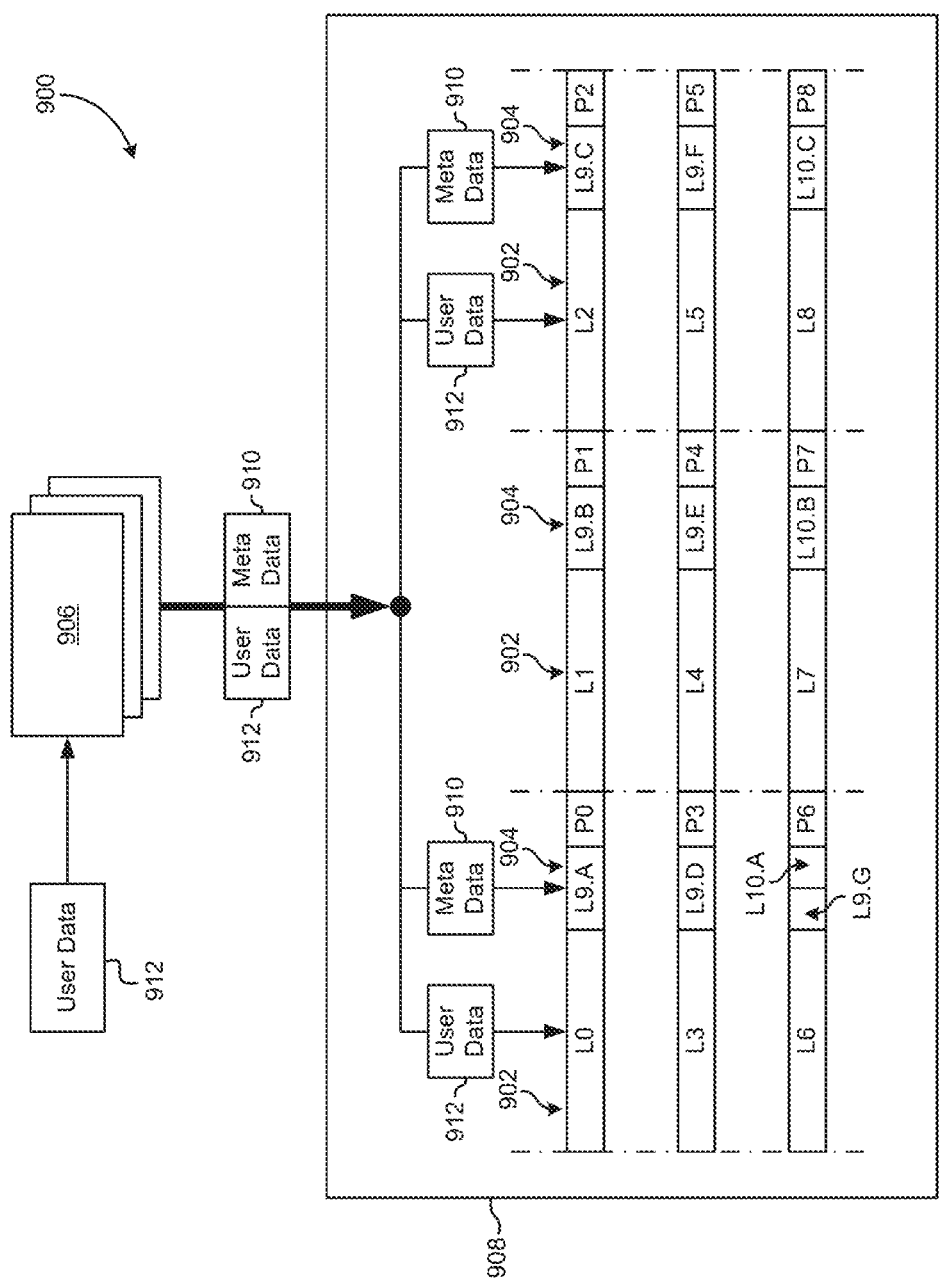
FIG. 9 is a block diagram of a system configured to store user data in aligned pages and metadata in dispersed pages of non-volatile memory.

Now referring to FIG. 9, in a first embodiment, since not all logical pages are used to store user data in an enterprise system 900, several upper layer(s) 906 (which may be software and/or hardware, such as a flash controller in one embodiment) on top of the flash memory 908 (which may be on one or more storage devices) store metadata 910 associated with the user data 912 stored to the flash memory 908. For instance, a RAID controller on top of an array of flash solid state drives or modules (SSDs) creates RAID stripes out of logical pages and associates an additional logical page with the RAID stripes, the additional logical page holding the parity for the stripe.

This type of metadata 910 experiences specific access patterns that do not depend on the user workload and is, therefore, predictable. For example, the parity in a RAID array is never read by the system during normal operation; instead, it is only read upon a drive failure, as required by the RAID reconstruction process. In addition, some software systems write certain data structures that are only read very rarely. For example, the synchronous transactional log in a database system and the journal of a journaling file system are only updated with new entries during normal operation. These structures are only read in the event of a failure to enable the system to reconstruct its state.

These types of logical pages, that only experience known, predictable access patterns that are dominated by write operations, are ideal candidates to be stored in dispersed pages 904 as opposed to aligned pages 902. To achieve this placement of metadata 910 to specific dispersed pages 904, a synergy between the flash memory 908 and the upper layers 906 in the system 900 is created, where the flash memory 908 (and/or a controller thereof) is configured to expose the logical addresses of the dispersed pages 904 to the upper layer(s) 906 and the upper layer(s) 906 is configured to only store logical pages that are not frequently read at these dispersed page addresses, in one embodiment.

For the RAID example described above, the layout of the logical pages of a RAID stripe in a RAID-5 scheme would be as shown in FIG. 10, where SX-Y (e.g., S0-0, S2-9, etc.) is the $Y^{th}$ logical page in the $X^{th}$ RAID stripe and SX-P (e.g., S0-P, S1-P, and S2-P) is the RAID parity page of the $X^{th}$ RAID stripe. In order to store these parity blocks in the SSDs, they are split across multiple dispersed page addresses denoted as SX-PZ, the portion being indicated by the Z (e.g., S0-PA, S2-PG, etc.) for each stripe X. In addition, the RAID parities SX-PZ are further protected by additional parity information PP-A, PP-B, and PP-C such that PP-A corresponds to the parity of S0-PC, S0-PF, S1-PB, S1-PE, S2-PB, and S2-PE, PP-B to the parity of S0-PA, S0-PD, S0-PG, S1-PC, S1-PF, S2-PC, and S2-PF, and PP-C to the parity of S0-PB, S0-PE, S1-PA, S1-PD, S1-PG, S2-PA, S2-PD, and S2-PG.

From FIG. 10 it is seen that because of the appropriate placement of the parity information, all data may be reconstructed in case one physical page of any SSD is lost.

Although only one placement for the parity information is shown, it will be Obvious to one skilled in the art to construct such a placement for different configurations of SSDs, ordering, RAID levels, etc. Also note that typically with a configuration of 10 SSDs, a 9+1 RAID-5 parity scheme is used whereas here 10+1 may be achieved because of the placement of parity information in the dispersed pages. Clearly, the RAID controller may be configured to ensure that logical pages that belong to the same RAID stripe are not stored in the same failure group (e.g., on the same device), for redundancy and data recovery purposes. One such arrangement is shown in FIG. 10 according to one embodiment. In this embodiment, the SSD may be a flash channel, flash lane, etc., which includes one, two, or more flash chips.

In this approach, the original location of the parity page is used for data, which increases storage efficiency. This additional data is protected by the page stripe RAID parity as well.

In real-world storage workloads, the distribution of read accesses to logical pages is often skewed, i.e., some pages are very "hot," experiencing a large number of read requests, a large number of pages are "warm," experiencing a moderate number of read requests, some are "cool," experiencing infrequent ads, and some are completely "cold," only rarely experiencing read requests or receiving no read requests at all.

Therefore, in another embodiment, the logical page access frequency (e.g., "heat") can be used to determine whether to store a given logical page as an aligned page or as a dispersed page using the skewed packing scheme.

Some methods of heat tracking for each logical page are configured to not affect the performance of a flash memory system and/or SSD. Any method that is able to distinguish read-hot pages from read-cold pages may be used, and the read heat may also be tracked on page groups, entire blocks, and/or Logical Erase Blocks (LEBs), in various approaches.

In one embodiment, an apparatus may include one or more memory devices, each memory device comprising non-volatile memory configured to store data, and a memory controller connected to the one or more memory devices. The memory controller may be configured to: receive data to be stored to the one or more memory devices, store read-hot logical pages within one ECC codeword as aligned pages, and store read-cold logical pages to straddle two or more ECC codewords as non-aligned pages and/or dispersed pages. It should be appreciated that in addition to NAND flash memory, the present invention can be implemented with a wide range of memory mediums, including for example NVRAM technologies such as NOR flash memory, phase-change memory (PCM or PRAM), magnetoresistive RAM (MRAM) and resistive RAM (RRAM).

In one embodiment, the memory controller may utilize a skewed packing scheme to store the data to the one or more memory devices. The skewed packing scheme includes: storing as many complete aligned pages as practical within each ECC codeword, and storing dispersed pages into remaining space of a plurality of ECC codewords. Each dispersed page comprises read-cold logical pages. Furthermore, in one approach, the memory controller may be further configured to preferentially store metadata associated with user data to the dispersed pages and/or preferentially store RAID parity to the dispersed pages.

In another embodiment, the memory controller may utilize a mixed packing scheme to store the data to the one or more memory devices. The mixed packing scheme may include storing read-hot data in aligned blocks of the one or more memory devices, and storing read-cold data in tightly-packed blocks of the one or more memory devices. The aligned blocks may comprise as many aligned pages as practical that fit within ECC codewords with no dispersed pages therein such that some unused space remains within the ECC codewords. Also, the tightly-packed blocks may comprise logical pages packed into ECC codewords sequentially with no spaces therebetween and straddling across two ECC codewords being allowed.

In a further embodiment, the apparatus may include a hot data buffer connected to the memory controller and a cold data buffer connected to the memory controller. In this embodiment, the memory controller may be further configured to store the read-hot data to the hot data buffer prior to storing the read-hot data to the aligned blocks, and store the read-cold data to the cold data buffer prior to storing the read-cold data to the tightly-packed blocks.

In another embodiment, the memory controller may be further configured to determine access frequency of logical pages of the data to be stored to the one or more memory devices prior to storing the data and/or receive access frequency information from higher layers with each write request. Furthermore, the memory controller may be further configured to utilize this access frequency to determine a first logical page to be a read-hot logical page when an access frequency of the first logical page exceeds a read access threshold, and determine a second logical page to be a read-cold logical page when an access frequency of the second logical page is below the read access threshold. Of course, the threshold may be used in a different way, as a percentage, hard numerical value, ratio, dynamically adjusted, etc.

Figure 11:
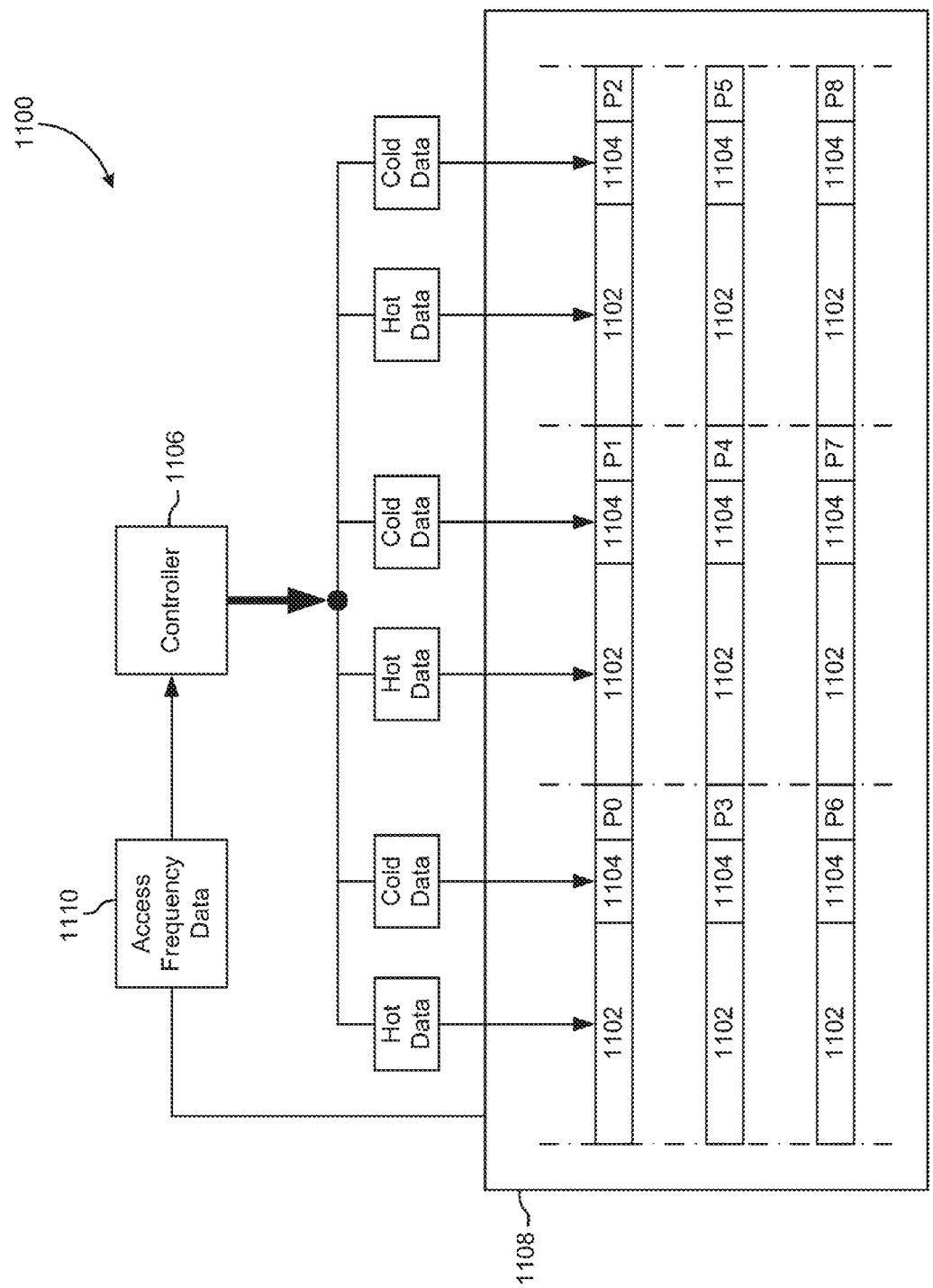
FIG. 11 is a block diagram of a memory system, according to one embodiment.

In particular, as shown in FIG. 11, a memory system 1100 may include a memory controller 1106 that may be configured to determine or receive access frequency data 1110 for data on the logical pages, i.e., maintain metadata regarding the number of read requests a logical page experiences and is configured to classify logical pages as "hot" or "cold" based on the access frequency. Although flash memory is shown, any type of non-volatile memory known in the art may be used in conjunction with memory system 1100, in various embodiments.

In more specific terms, the memory controller 1106 is configured to identify the coldest (least frequently accessed) of the logical pages, according to one embodiment. In one approach, relying again on the previous example, the controller 1106 may be configured to identify the logical pages which constitute for example the 12.5% coldest or least frequently accessed of the logical pages, since there were 8 logical pages, with one of the logical pages needing to be dispersed, which represents ⅛ of the logical pages or 12.5%. When a logical page is to be written to the flash memory 1108, a decision is made by the controller 1106 as to whether the logical page belongs in the 12.5% of the coldest of the logical pages. When the logical page is in the coldest 12.5%, it may be preferentially stored as a dispersed page 1104; otherwise, the logical page may be preferentially stored as an aligned page 1102.

Figure 12:
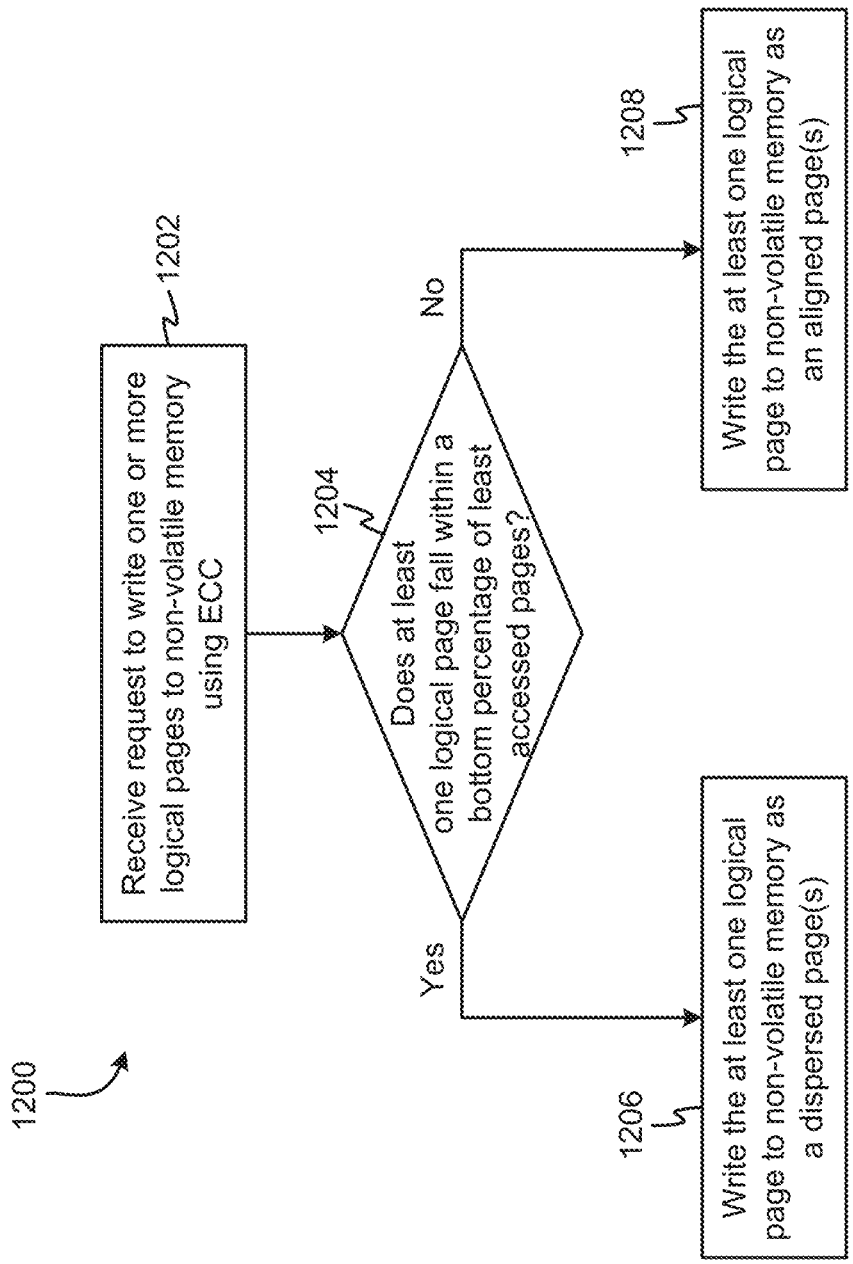
FIG. 12 shows a flowchart of a method, according to one embodiment.

This decision is made when a logical page is written to the device, as shown by method 1200 in FIG. 12, according to one embodiment. As shown, in operation 1202, the controller receives a request to write one or more logical pages to non-volatile memory (such as flash memory, etc.). In operation 1204, it is determined whether at least one of the logical pages falls within a predetermined bottom percentage of least accessed logical pages (e.g., number of logical pages to be written as dispersed pages/total number of logical pages, in %). When the at least one of the logical pages is within the bottom percentage of least accessed logical pages, method 1200 continues to operation 1206; otherwise, method 1200 continues to operation 1208.

In operation 1206, the at least one of the logical pages is written to non-volatile memory as a dispersed page(s), when possible. In operation 1208, the at least one of the logical pages is written to non-volatile memory as an aligned page(s), when possible. Memory controllers typically first aggregate data to be written in dynamic random-access memory (DRAM) buffers and only write to non-volatile memory once enough data has been accumulated (typically a logical page worth of data). In that sense, the controller will place the at least one of the logical pages in an appropriate buffer, offset, temporary memory, etc., so that upon the write operation being authorized, the page will be written in an aligned or a dispersed fashion accordingly.

For some applications, the high read latency of the dispersed pages under the skewed packing scheme shown in FIG. 9 may be unacceptable despite the average RA/SE ratio being sufficient. Thus, the skewed packing scheme should not be used in these applications.

In these cases, memory page access frequency ("heat") tracking may be taken advantage of to strike a better SE/RA ratio than the aligned packing or tight packing schemes alone and a better worst-case read latency than skewed packing. To accomplish this, the controller may be configured to create two types of blocks: aligned blocks, i.e., blocks with aligned logical pages; and tight blocks, i.e., blocks with tightly-packed logical pages. When striping is used, the controller may be configured to create aligned stripes and tightly-packed stripes for their respective blocks. At any point in time, the device may have a number of aligned blocks, with the remainder of the blocks being tightly packed.

The controller places "hotter" data in aligned blocks and "colder" data in tightly-packed blocks. To achieve this arrangement, the controller maintains at least one memory buffer for "hot" data, referred to as a hot buffer, and at least one memory buffer for "cold" data, referred to as a cold buffer. When a hot page is to be written to the non-volatile memory, it is placed in the hot buffer. When a cold page is to be written, it is placed in the cold buffer. When the hot buffer becomes full, data is written out to blocks (or block stripes) with the logical pages being aligned in codewords. When the cold buffer becomes full, data is written out to blocks (or block stripes) with the logical pages being tightly packed.

Figure 13:
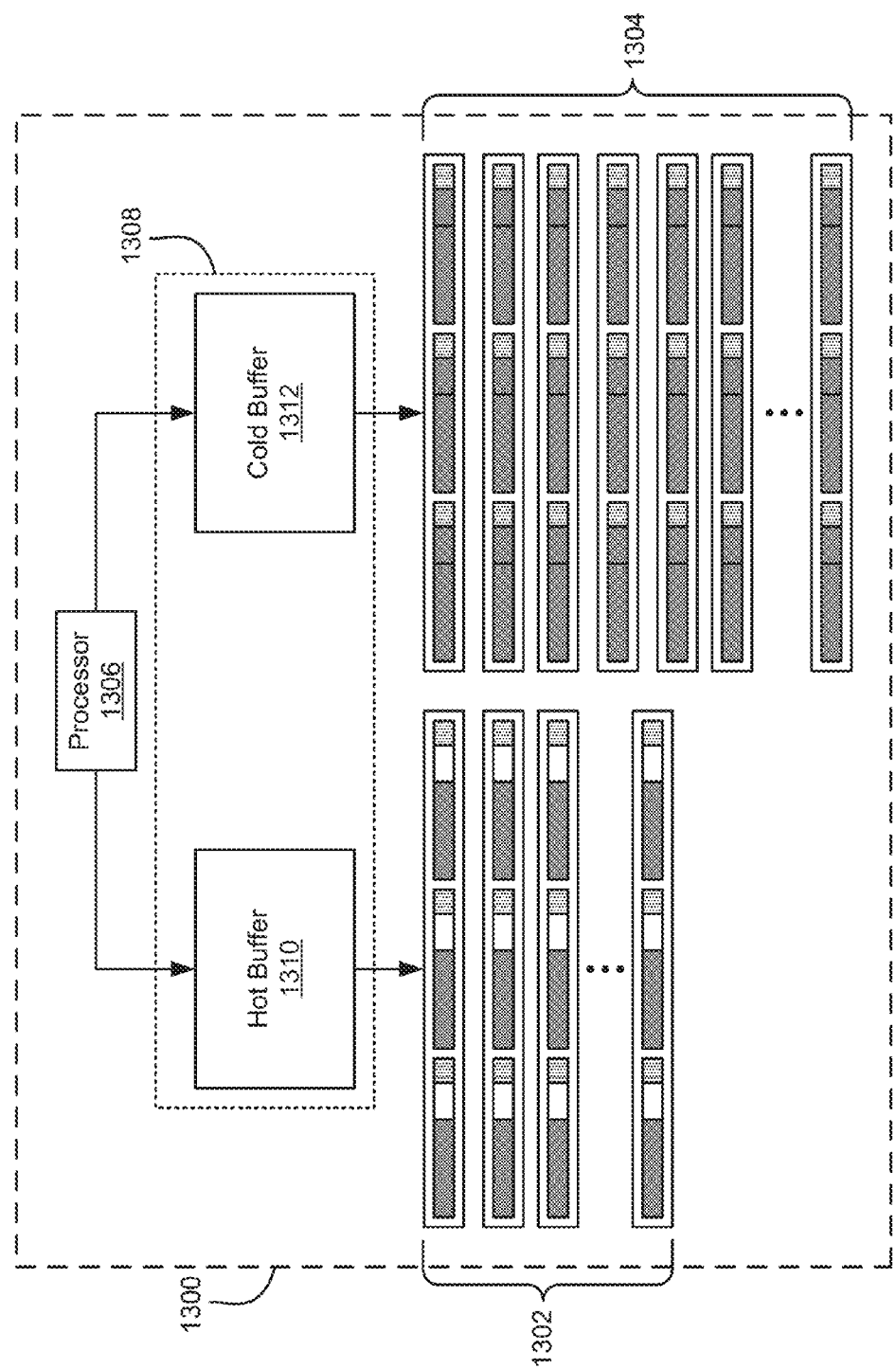
FIG. 13 is a block diagram of a controller, according to one embodiment.

A controller 1300 is shown in FIG. 13 according to one embodiment. Using this controller 1300, hot data is read with the lowest possible read amplification, while cold data is stored in the most space-efficient way. By tuning the ration of aligned blocks 1302 over tightly-packed blocks 1304, a desired Space Efficiency over Read Amplification (SE/RA) ratio is achievable.

Figure 14:
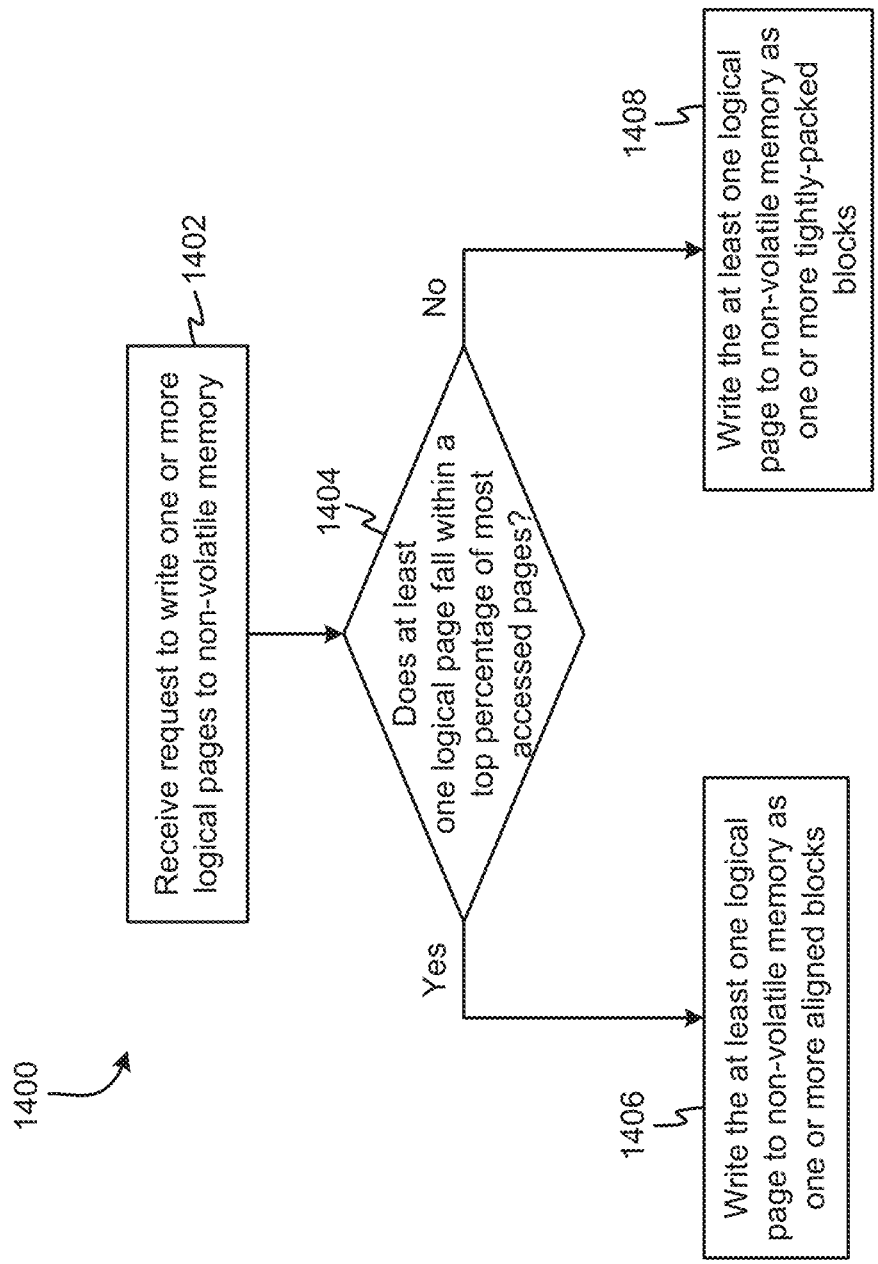
FIG. 14 shows a flowchart of a method, according to one embodiment.

In order to decide whether data should be written to an aligned or tightly-packed block, it is helpful for the controller 1300 to determine whether the data is read-hot or read-cold, as described in FIGS. 13-14, in several embodiments. Some advantages of making this determination is that blocks contain data of the same read-temperature, which functions to ease data management. Also, the maximum amount of page dispersion is much lower when using the mixed packing scheme, as compared to the skewed packing scheme, resulting in an improved worst-case read latency. One disadvantage is that some storage capacity is sacrificed when blocks are written in the aligned format. However, for typical workloads, only a small percentage of blocks are deemed to be read-hot, so the capacity loss may be controlled and mitigated based on a read access threshold used.

Referring again to FIG. 13, the controller 1300 comprises a processor 1306 of a type known in the art, and fast access memory 1308 of a type known in the art for hosting a hot buffer 1310 for storing the aligned blocks 1302 and a cold buffer 1312 for storing the tightly-packed blocks 1304. The buffers may include non-volatile memory of a type known in the art, or volatile memory that is fast access, but will not survive a loss of power.

A method 1400 for storing data in non-volatile memory is shown in FIG. 14 according to one embodiment. As shown, in operation 1402, the controller receives a request to write one or more logical pages to the non-volatile memory. In operation 1404, it is determined whether at least one of the logical pages falls within a predetermined top percentage of most accessed logical pages (e.g., number of logical pages to be written as dispersed pages/total number of logical pages, in %). When the at least one of the logical pages is within the top percentage of most accessed logical pages, method 1400 continues to operation 1406; otherwise, method 1400 continues to operation 1408.

In operation 1406, the at least one of the logical pages is written to non-volatile memory as one or more aligned blocks of data. In operation 1408, the at least one of the logical pages is written to non-volatile memory as one or more tightly-packed blocks of data. Memory controllers typically first aggregate data to be written in DRAM buffers and only write to non-volatile memory once enough data has been accumulated (typically a logical page worth of data). In that sense, the controller will place the at least one of the logical pages in an appropriate buffer, offset, temporary memory, etc., so that upon the write operation being authorized, the page will be written in an aligned or a tightly-packed fashion accordingly.

In a preferred embodiment, the largest number of blocks in the system (e.g., 75%, 80%, 90%, 95%, etc., of the blocks) are tightly-packed, so that acceptable space efficiency is achieved overall. The rest of the blocks (e.g., 25%, 20%, 10%, 5%, etc., of the blocks) are aligned. Such a configuration may be configured so that it works in unison with a read heat distribution of the actual data, e.g., workloads that exhibit an 80/20 read heat distribution would have flash memory configured to be used in an 80/20 tightly-packed to aligned arrangement, where 80% of the read accesses target 20% of the data. In other words, in this example, 20% of the data is hot, while the remaining 80% of the data is cold. Using the mixed scheme in this example achieves very good performance and very good space utilization.

Since the actual skewing of the workload is not known, the ratio of aligned to tightly-packed blocks may be further coupled with the current write amplification. For example., when write amplification increases (i.e., workload appears to be more random than skewed in one direction or another), the ratio of allocated aligned blocks may be decreased, hence pages will have to be hotter to be placed in an aligned block. Otherwise, when write amplification decreases, more aligned blocks may be allocated compared to tightly-packed blocks. Hence, slightly less hot pages will be placed into aligned blocks than previously allocated, in order to maintain a desirable SE/RA ratio, as determined by a user or administrator designing the storage arrangement.

Figure 15:
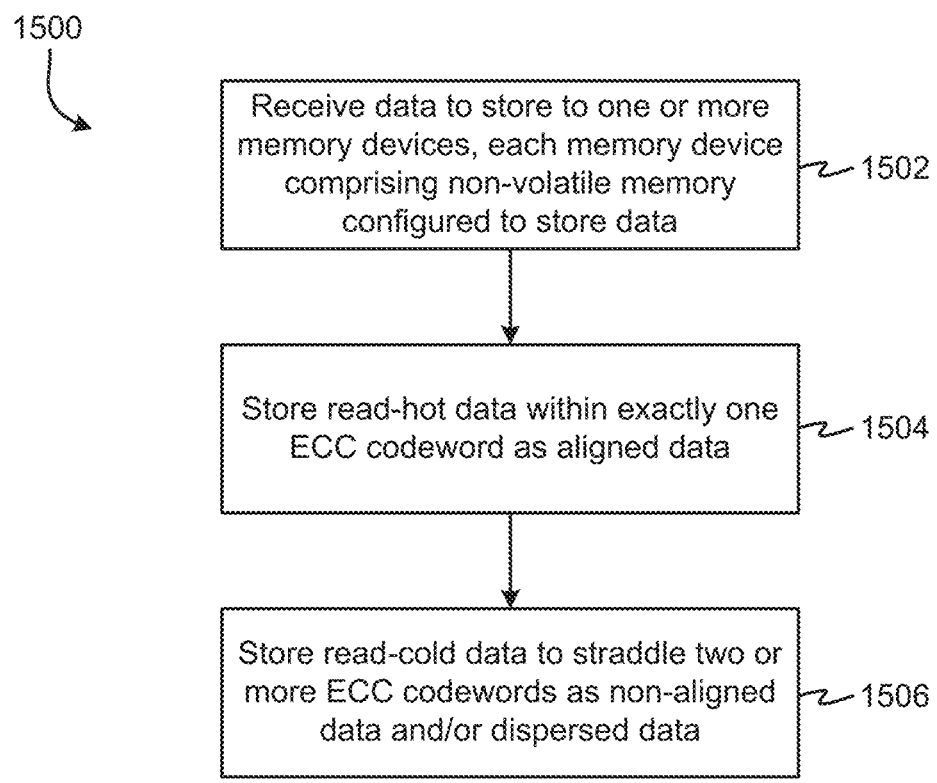
FIG. 15 shows a flowchart of a method, according to one embodiment.

Now referring to FIG. 15, a method 1500 is shown according to one embodiment. The method 1500 may be performed in accordance with the present invention in any of the environments depicted in FIGS. 1-14, among others, in various embodiments. Of course, more or less operations than those specifically described in FIG. 15 may be included in method 1500, as would be understood by one of skill in the art upon reading the present descriptions.

Each of the steps of the method 1500 may be performed by any suitable component of the operating environment. For example, in various embodiments, the method 1500 may be partially or entirely performed by a processor (such as a CPU, an ASIC, an FPGA, etc.), a module, a function block, a controller, a hierarchical storage manager, a buffer controller, etc., in various approaches.

As shown in FIG. 15, method 1500 may initiate with operation 1502, where data to store to one or more memory devices is received, such as by a memory controller or some other suitable processor. Each of the memory devices comprises non-volatile memory configured to store data, the non-volatile memory device may comprise any type of NVRAM medium as previously mentioned and may be in the form of modules, SSDs, chips, nodes, etc.

In operation 1504, read-hot data is stored within one ECC codeword as aligned data. In one embodiment, the read-hot data may be a read-hot logical page or portion thereof, or some other data portion known in the art.

Furthermore, in some embodiments, the read-hot data may comprise read-hot user data and/or metadata.

In operation 1506, read-cold data is stored to straddle two or more ECC codewords as non-aligned data and/or dispersed data, depending on the packing scheme utilized (e.g., skewed, mixed, etc.). In one embodiment, the read-cold data may be a read-cold logical page or portion thereof, or some other data portion known in the art.

Furthermore, in some embodiments, the read-cold data may comprise read-cold user data and/or metadata.

The choice of packing scheme may depend on characteristics of the data to be stored (such as type of data, read/write ratio for this data, an access frequency for the data, etc.), usage of the memory device(s), and/or any other relevant considerations that would be known to one of skill in the art.

In one approach, either a skewed packing scheme or a mixed packing scheme may be used to store the data to the one or more memory devices.

In one embodiment, the skewed packing scheme may comprise storing as much aligned data (complete portions of aligned data, such as a complete logical page, data portion, etc.) as practical within each ECC codeword and then storing dispersed data into remaining space of a plurality of ECC codewords. In this way, dispersed data comprises read-cold data, which is accessed less frequently and will cause less effect on the performance of the memory devices.

In a further embodiment, the skewed packing scheme may comprise storing groups of seven codewords into eight logical pages, seven of the eight logical pages not crossing codeword boundaries and being stored as aligned pages, and a remaining eighth logical page being decomposed into seven fragments and being stored across all seven codewords as a dispersed page. In this embodiment, each codeword includes user data and parity such that the user data may be restored should read or write errors occur during storage or retrieval of the user data from the flash memory device(s).

In another embodiment, the mixed packing scheme may comprise storing read-hot data in aligned blocks of the one or more memory devices and storing read-cold data in tightly-packed blocks of the one or more memory devices. The aligned blocks may comprise a maximized amount of data that fit within ECC codewords, and at least a plurality of the aligned block have no dispersed data therein, such that some unused space remains within the ECC codewords. Also, the tightly-packed blocks may comprise read-cold data packed into ECC codewords sequentially, with no spaces therebetween, and straddling across two (or more) ECC codewords being allowed (and common).

Read-hot data may be considered as data which is anticipated to be accessed more frequently than a predetermined read access threshold. The predetermined read access threshold may be set by a user or automatically set based on characteristics of the data, such as average read access frequency, access distribution across all the data, etc. Read-cold data may be considered as data which is anticipated to be accessed less frequently than the predetermined read access threshold.

In one embodiment, the predetermined read access threshold may be set so that a certain amount of data portions (such as logical pages, etc.) fall within one of the two categories, e.g., for a 75/25 split, 75% of the data portions would fall below the predetermined read access threshold and be labeled read-cold data portions, and 25% of the data portions would be equal to or greater than the predetermined read access threshold and be labeled read-hot data portions.

In another embodiment, metadata associated with user data may be preferentially stored as the dispersed data. When all dispersed data is already full, then the metadata may be stored as the aligned data. The metadata, in a further embodiment, may comprise parity (such as codeword parity, RAID stripe parity, etc.) for the user data.

In another embodiment, logical pages which belong to the same RAID stripe are not stored on the same memory device, but instead are dispersed across more than one memory device, as best as possible, to ensure there is not a single point of failure.

The method 1500 may also include determining a logical address of each dispersed page (such as by having each of the memory devices provide such addresses to an upper layer, such as a memory controller), storing logical pages which are accessed less frequently than a predetermined access threshold preferentially as one or more dispersed pages, and storing logical pages which are accessed more frequently than the predetermined access threshold preferentially as one or more aligned pages. The access threshold may be determined by a user or automatically set based on any desired factors or characteristics of the workloads which will be handled by the memory devices, such that a majority of the data will be stored in aligned pages, and only less frequently accessed data is stored in dispersed pages, such as metadata, parity, etc.

In another embodiment, method 1500 may include receiving one or more logical pages to store to the one or more memory devices, determining whether at least one of the one or more logical pages belongs to a predetermined portion of least accessed logical pages, preferentially storing the at least one of the one or more logical pages which belongs to the predetermined portion of least accessed logical pages as one or more dispersed pages, and preferentially storing any of the one or more topical pages which do not belong to the predetermined portion of least accessed logical pages as one or more aligned pages. In this way, since it is known how many pages must be stored as dispersed pages, after this percentage is determined, pages which fall below this predetermined portion of least accessed logical pages would be stored as dispersed pages, as long as there is still space available in the dispersed pages.

In another embodiment, when using the mixed packing scheme, method 1500 may further include determining whether data to be stored to the one or more memory devices is hot data or cold data based on an access frequency of the data, storing hot data to a hot data buffer, storing cold data to a cold data buffer, writing the hot data from the hot data buffer to the aligned blocks of the one or more memory devices when the hot data buffer is full or has exceeded a write threshold, and writing the cold data from the cold data buffer to the tightly-packed blocks of the one or more memory devices when the cold data buffer is full or has exceeded the write threshold.

The write threshold may be a certain percentage of space for the hot or cold data buffer (such as 75%, 80%, 85%, 90%, etc.), a numerical value of data in the hot or cold data buffer (such as 1 MB, 10 MB, 100 MB, 1 GB, etc.), or some other suitable threshold value which indicates that the hot or cold data buffer is close to being filled up and should be emptied by writing data therein out to the memory devices. The threshold may be determined by a user or automatically set based on historical performance characteristics of the system, size of the hot and cold data buffers, etc.

In another embodiment, each of the aligned blocks include a codeword comprising one logical page which does not break across more than one codeword. Also, each of the tightly-packed blocks includes one or more logical pages stored in a most space efficient manner, such as by storing the logical pages one after another across as many codewords as is necessary, regardless of any RA implications of the storage method.

Figure 16:
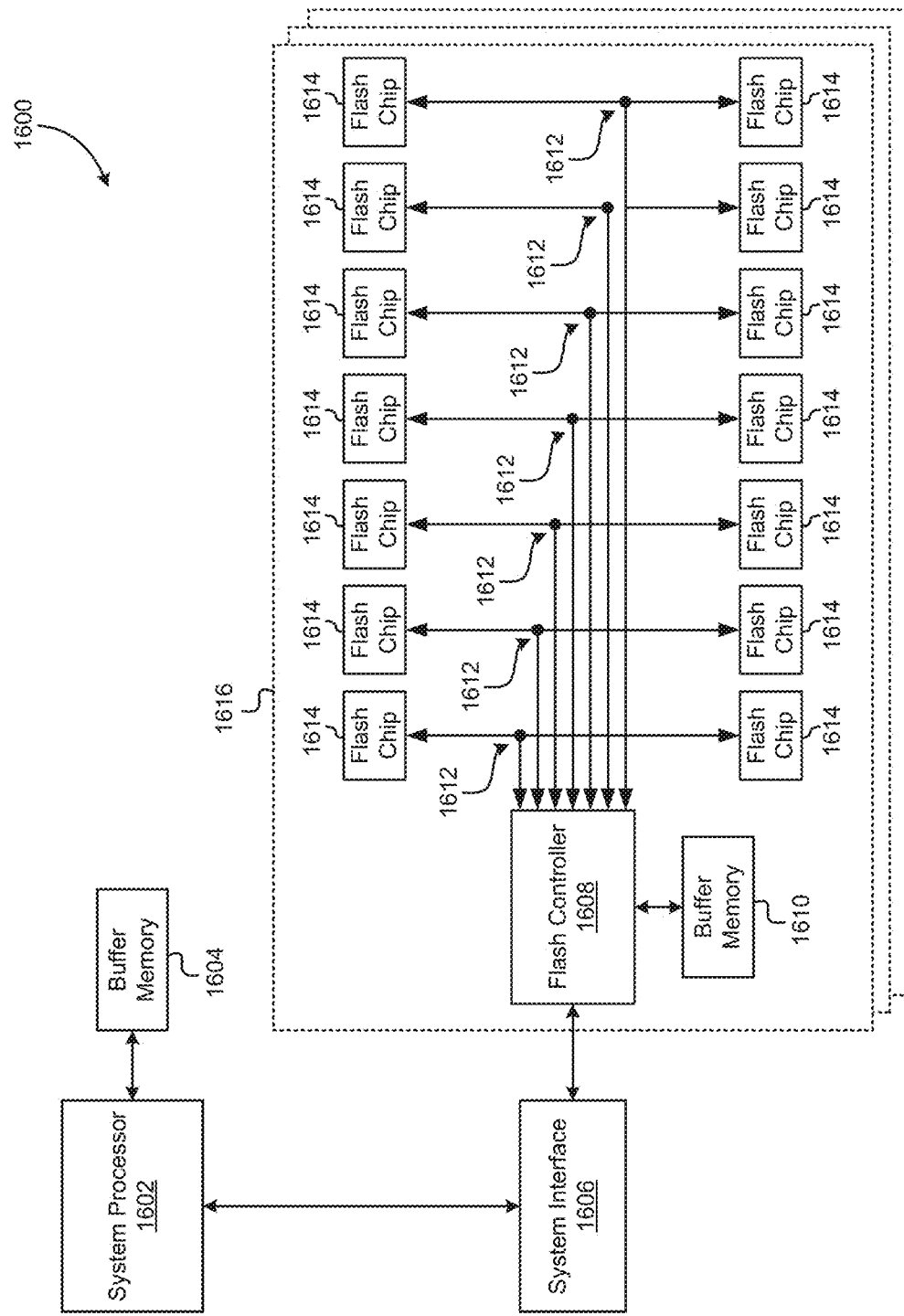
FIG. 16 is a block diagram of a flash memory system according to one embodiment.

With reference to FIG. 16, a flash memory system 1600 is shown according to one embodiment. Although the descriptions provided herein are not limited to being used with a flash system, this is one exemplary embodiment of a non-volatile memory system with which the present invention may be used. The system processor 1602 (which may be a CPU or some other suitable processor known in the art) is coupled to a suitable buffer memory 1604 (such as DDR RAM or some other suitable memory known in the art) and a system interface 1606 which acts as a gateway to a flash controller 1608. The system interface 1606 may be implemented in a FPGA, ASIC, or some other suitable processor known in the art. The flash controller (which may be implemented in a FPGA, ASIC, or some other suitable processor known in the art) is coupled to a second buffer memory 1610 (such as DDR RAM or some other suitable memory known in the art) and a plurality of flash lanes 1612.

Each lane (or channel) 1612 may have one, two, or more flash chips 1614 or modules coupled together. In one embodiment, a lane 1612 may be a SSD or some other flash device known in the art.

A block stripe (not shown) defines one block on each lane 1612. The blocks in one block stripe may be located at different locations in each flash chip 1614 and therefore do not necessarily have the same block address in the flash chips 1614. Also, a page stripe (not shown) may be built from one page index in a block stripe (e.g., all pages within index x in all blocks of the block stripe). RAID parity may then be calculated over a block stripe (or page stripes inside a block stripe).

Each flash controller 1608 may define a flash node 1616, of which there may be two, four, or more such flash nodes 1616 within a single flash system 1600.

The present invention may be a system, a method, and/or a computer program product. The computer program product may include a compute readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer programs products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device o cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with what is meant is that the processor has logic embedded therewith as hardware logic, such as an ASIC, a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a CPU, an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An apparatus, comprising:
   one or more memory devices, each memory device comprising non-volatile memory configured to store data; and
   a memory controller connected to the one or more memory devices, the memory controller being configured to:
      receive data to be stored to the one or more memory devices;
      partition the data to be stored to the one or more memory devices based on access frequency tracking of the data to be stored to the one or more memory devices;
      store read-hot data within one error correction code (ECC) codeword as aligned data; and
      store read-cold data to straddle two or more ECC codewords as non-aligned data and/or dispersed data.

2. The apparatus as recited in claim 1, wherein the memory controller utilizes a skewed packing scheme to store the data to the one or more memory devices, the skewed packing scheme comprising:
   storing the aligned data within a plurality of ECC codewords; and
   storing the non-aligned data and/or the dispersed data into remaining space of the plurality of ECC codewords,
   wherein the non-aligned data and/or the dispersed data comprises all of the read-cold data.

3. The apparatus as recited in claim 2, wherein the memory controller is further configured to preferentially store metadata associated with user data as the non-aligned data and/or the dispersed data and read-hot user data as the aligned data.

4. The apparatus as recited in claim 2, wherein the memory controller is further configured to preferentially store redundant array of independent disk (RAID) parity as the dispersed data, and wherein the read-hot data stored as the aligned data comprises read-hot logical pages of the RAID.

5. The apparatus as recited in claim 1, wherein the memory controller utilizes a mixed packing scheme to store the data to the one or more memory devices, the mixed packing scheme comprising:
   storing the read-hot data in aligned blocks of the one or more memory devices; and
   storing the read-cold data in tightly-packed blocks of the one or more memory devices,
   wherein the aligned blocks comprise a maximized amount of aligned read-hot data within ECC codewords, at least a plurality of the aligned blocks having no dispersed data therein, wherein some unused space remains within the ECC codewords storing the aligned blocks, and
   wherein the tightly-packed blocks comprise the read-cold data packed into ECC codewords sequentially and straddling across two or more ECC codewords being allowed.

6. The apparatus as recited in claim 5, further comprising:
   a hot data buffer connected to the memory controller; and
   a cold data buffer connected to the memory controller,
   wherein the memory controller is further configured to:
      store the read-hot data to the hot data buffer prior to storing the read-hot data to the aligned blocks; and
      store the read-cold data to the cold data buffer prior to storing the read-cold data to the tightly-packed blocks.

7. The apparatus as recited in claim 1, wherein a payload length of an ECC used to encode the data is larger than a granularity of read access and write access for the one or more memory devices, wherein the read-hot data includes read-hot user data, read-hot metadata, or read-hot data and read-hot metadata, and wherein the read-cold data includes read-cold user data, read-cold metadata, or read-cold user data and read-cold metadata.

8. The apparatus as recited in claim 1, wherein the memory controller is further configured to determine access frequency of portions of the data to be stored to the one or more memory devices prior to storing the data, wherein each ECC codeword is a set of bits that are encoded and decoded together and includes user data bits and parity bits provided by an ECC code used for encoding the user data bits and the parity bits, wherein each ECC codeword is stored on continuous space in the one or more memory devices, and wherein a plurality of the memory devices are NAND flash NVRAM.

9. The apparatus as recited in claim 8, wherein the memory controller is further configured to:
  determine a first data portion to be the read-hot data in response to a determination that an access frequency of the first data portion exceeds a read access threshold; and
  determine a second data portion to be the read-cold data in response to a determination that an access frequency of the second data portion is at or below the read access threshold.

10. The apparatus as recited in claim 1, wherein the read-hot data corresponds to a read-hot logical page and wherein the read-cold data corresponds to a read-cold logical page.

11. A computer program product for storing data in non-volatile memory, the computer program product comprising a computer readable storage medium having program instructions embodied therewith, the program instructions being executed by a processor to cause the processor to:
  receive data, by the processor, to store to one or more memory devices, each memory device comprising non-volatile memory configured to store data;
  partition, by the processor, the data to be stored to the one or more memory devices based on access frequency tracking of the data to be stored to the one or more memory devices;
  store, by the processor, read-hot data within one error correction code (ECC) codeword as aligned data; and
  store, by the processor, read-cold data to straddle two or more ECC codewords as non-aligned data and/or dispersed data.

12. The computer program product as recited in claim 11, wherein a skewed packing scheme is used to store the data to the one or more memory devices, and wherein the program instructions are further readable and/or executable by the processor to cause the processor to:
  primarily store, by the processor, aligned data within a plurality of ECC codewords; and
  store, by the processor, dispersed data into remaining space of a plurality of ECC codewords,
  wherein dispersed data comprises read-cold data.

13. The computer program product as recited in claim 12, wherein the program instructions are further readable and/or executable by the processor to cause the processor to preferentially store metadata associated with user data as the dispersed data and read-hot user data as the aligned data.

14. The computer program product as recited in claim 12, wherein the program instructions are further readable and/or executable by the processor to cause the processor to preferentially store redundant array of independent disk (RAID) parity as the dispersed data, and wherein the read-hot data stored as the aligned data comprises read-hot logical pages of the RAID.

15. The computer program product as recited in claim 11, wherein a mixed packing scheme is used to store the data to the one or more memory devices, and wherein the program instructions are further readable and/or executable by the processor to cause the processor to:
  store, by the processor, the read-hot data in aligned blocks of the one or more memory devices; and
  store, by the processor, the read-cold data in tightly-packed blocks of the one or more memory devices,
  wherein the aligned blocks comprise a maximized amount of aligned data within ECC codewords, at least a plurality of said aligned block having no dispersed data therein such that some unused space remains within the ECC codewords, and
  wherein the tightly-packed blocks comprise read-cold data packed into ECC codewords sequentially and straddling across two ECC codewords being allowed.

16. The computer program product as recited in claim 15, wherein the program instructions are further readable and/or executable by the processor to:
  store, by the processor, the read-hot data to a hot data buffer prior to storing the read-hot data to the aligned blocks; and
  store, by the processor, the read-cold data to a cold data buffer prior to storing the read-cold data to the tightly-packed blocks.

17. The computer program product as recited in claim 11, wherein a payload length of an ECC used to encode the data is larger than a granularity of read access and write access for the one or more memory devices, wherein the read-hot data includes at least one of read-hot user data and read-hot metadata, and wherein the read-cold data includes at least one of read-cold user data and read-cold metadata.

18. The computer program product as recited in claim 11, wherein the program instructions are further readable and/or executable by the processor to:
  determine, by the processor, access frequency of portions of the data to be stored to the one or more memory devices prior to storing the data;
  determine, by the processor, a first data portion to be a read-hot data portion when an access frequency of the first data portion exceeds a read access threshold; and
  determine, by the processor, a second data portion to be a read-cold data portion when an access frequency of the second data portion is below the read access threshold, and wherein a plurality of the memory devices are NAND flash NVRAM.

19. A method for storing data to non-volatile memory, the method comprising:
  receiving data to store to one or more memory devices, each memory device comprising non-volatile memory configured to store data;
  partitioning the data to be stored to the one or more memory devices based on access frequency tracking of the data to be stored to the one or more memory devices;
  storing read-hot logical pages within one error correction code (ECC) codeword as aligned pages; and
  storing read-cold logical pages to straddle two or more ECC codewords as non-aligned pages and/or dispersed pages.

20. The method as recited in claim 19, wherein a skewed packing scheme or a mixed packing scheme are used to store the data to the one or more memory devices,
  wherein the skewed packing scheme comprises:
    primarily storing complete aligned pages within a plurality of ECC codewords; and
    storing dispersed pages into remaining space of a plurality of ECC codewords,
    wherein each dispersed page comprises read-cold logical pages, and wherein the mixed packing scheme comprises:
    storing read-hot data in aligned blocks of the one or more memory devices; and
    storing read-cold data in tightly-packed blocks of the one or more memory devices,
    wherein the aligned blocks comprise a maximized amount of aligned pages within ECC codewords, at least a plurality of said aligned block having no dispersed pages therein, such that some unused space remains within the ECC codewords, and wherein the tightly-packed blocks comprise logical pages packed into ECC codewords sequentially and straddling across two ECC codewords being allowed.

* * * * *